US006640407B1

(12) United States Patent
Ou et al.

(10) Patent No.: US 6,640,407 B1
(45) Date of Patent: Nov. 4, 2003

(54) BEARING DETACHMENT DEVICE

(76) Inventors: Chin-Sung Ou, 58, Ma Yuan West St., Taichung (TW); Jin-Jaw Chen, 58, Ma Yuan West St., Taichung (TW)

( * ) Notice: Subject to any disclaimer, the term of this patent is extended or adjusted under 35 U.S.C. 154(b) by 28 days.

(21) Appl. No.: 10/176,513

(22) Filed: Jun. 18, 2002

(51) Int. Cl.[7] .......... B23P 19/04

(52) U.S. Cl. .......... 29/252

(58) Field of Search .......... 29/252, 261, 262, 29/246; 254/93 R, 93 H, 2 R, 2 B, 4 R, 4 B, 8 R, 8 B; 269/17

(56) References Cited

U.S. PATENT DOCUMENTS 2,836,317 A * 5/1958 Oury .......... 254/2 R
5,195,726 A * 3/1993 Kaner .......... 254/4 B
5,233,740 A * 8/1993 Chen .......... 29/252
5,269,501 A * 12/1993 Liegel et al. .......... 254/4 B
5,419,027 A * 5/1995 McPeak et al. .......... 29/252
6,266,861 B1 * 7/2001 Chen .......... 29/261

* cited by examiner

*Primary Examiner*—Robert C. Watson

(57) ABSTRACT

A bearing detachment device has a main panel, a pneumatic cylinder, a plurality of support rods, a plurality of catch plates, a fast positioning device, a plurality of oblong blocks, a plurality of connecting bars, and a cylindrical block. The main panel has a center hole to receive the pneumatic cylinder, a plurality of lugs, and a plurality of bottom grooves. Each support rod has a threaded pillar inserted in the oblong block. Each oblong block is inserted in the corresponding bottom groove. Each catch plate has two end claws. Each connecting bar is inserted in the corresponding lug. Each connecting bar and the corresponding lug are fastened together. Each connecting bar and the corresponding catch plate are fastened together. The fast positioning device is disposed on the main panel. The cylindrical block has an oblong groove and a threaded column to engage with an end block of the pneumatic cylinder.

6 Claims, 16 Drawing Sheets

BEARING DETACHMENT DEVICE

BACKGROUND OF THE INVENTION

The present invention relates to a bearing detachment device. More particularly, the present invention relates to a bearing detachment device which is easily operated.

A heavy bearing has a weight between fifty kilograms and two hundred kilograms. Therefore, the heavy bearing should be carried by many persons in order to assemble the heavy bearing on a machine or to detach the heavy bearing from the machine. However, it is dangerous to carry, assemble or detach the heavy bearing.

SUMMARY OF THE INVENTION

An object of the present invention is to provide a bearing detachment device which is operated easily.

Another object of the present invention is to provide a bearing detachment device which is operated safely.

Another object of the present invention is to provide a bearing detachment device which can eliminate a stress concentration.

Accordingly, a bearing detachment device comprises a main panel, a pneumatic cylinder, a plurality of.support rods, a plurality of catch plates, a fast positioning device, a plurality of oblong blocks, a plurality of connecting bars, and a cylindrical block. The main panel has a center hole to receive the pneumatic cylinder, a hanging ring having a circular hole, a plurality of lugs, a plurality of bottom grooves, and a threaded recess. Each lug has a pivot aperture. Each oblong block has a threaded hole. Each support rod has at least a threaded pillar inserted in the oblong block, a plurality of threaded apertures, and an embossed pattern. Each oblong block is inserted in the corresponding bottom groove. Each catch plate has two end claws and at least a pivot hole. Each connecting bar has a first circular aperture and a second circular aperture. Each connecting bar is inserted in the corresponding lug. A bolt passes through the corresponding first circular aperture and the corresponding pivot aperture to fasten the corresponding connecting bar and the corresponding lug together. A screw passes through the corresponding second circular aperture and the corresponding pivot hole to fasten the corresponding connecting bar and the corresponding catch plate together. The fast positioning device is disposed on the main panel. The fast positioning device has a pair of clamping plates, a pair of gears engaging with each other, each gear disposed on the corresponding clamping plate, a pair of pillars, each pillar disposed on the corresponding clamping plate, a spring connected to the pillars, and two disk columns. Each gear has a positioning aperture to receive the corresponding disk column. A fastener is inserted in the threaded recess. Each clamping plate has an end groove to enclose the fastener. The clamping plates clamp the pneumatic cylinder. The pneumatic cylinder has a periphery recess, a drive rod having an end block, a first pull ring, a second pull ring, a first gas release joint, a second gas release joint, a first handle, and a second handle. The cylindrical block has an oblong groove and a threaded column to engage with the end block.

DETAILED DESCRIPTION OF THE INVENTION

Figure 1:
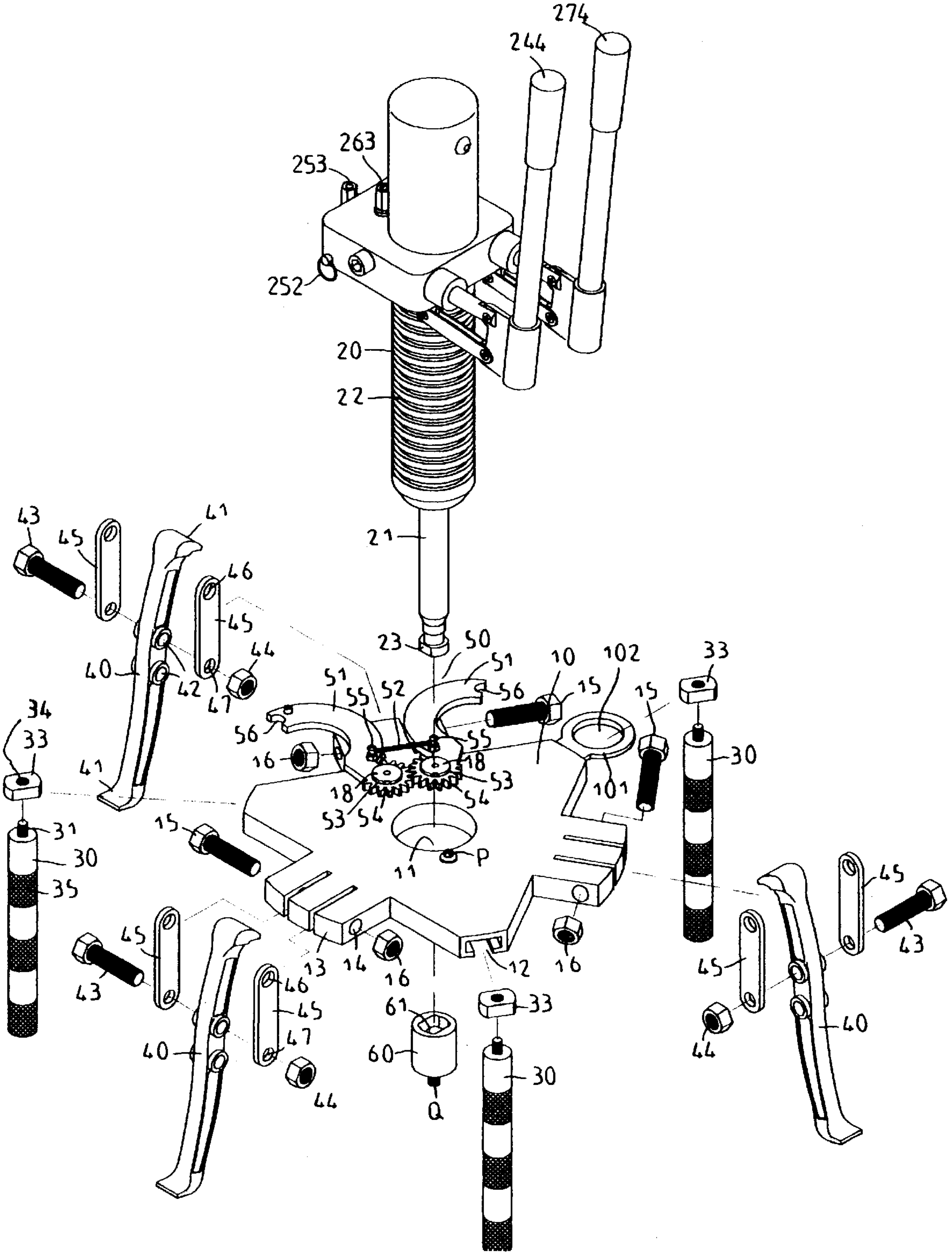
FIG. 1 is a perspective exploded view of a bearing detachment device of a preferred embodiment in accordance with the present invention.
Figure 2:
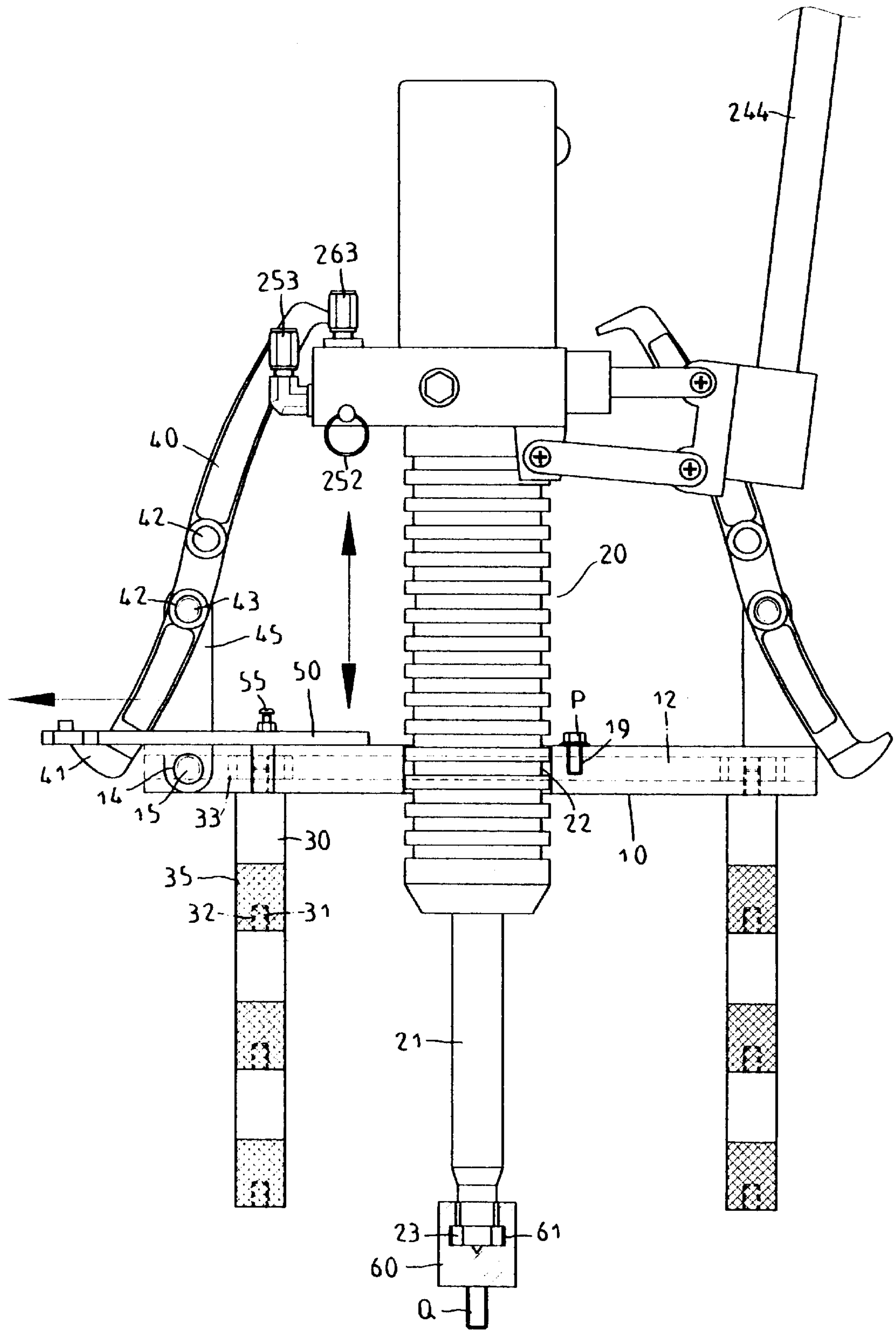
FIG. 2 is an elevational assembly view of a bearing detachment device of a preferred embodiment in accordance with the present invention.
Figure 3:
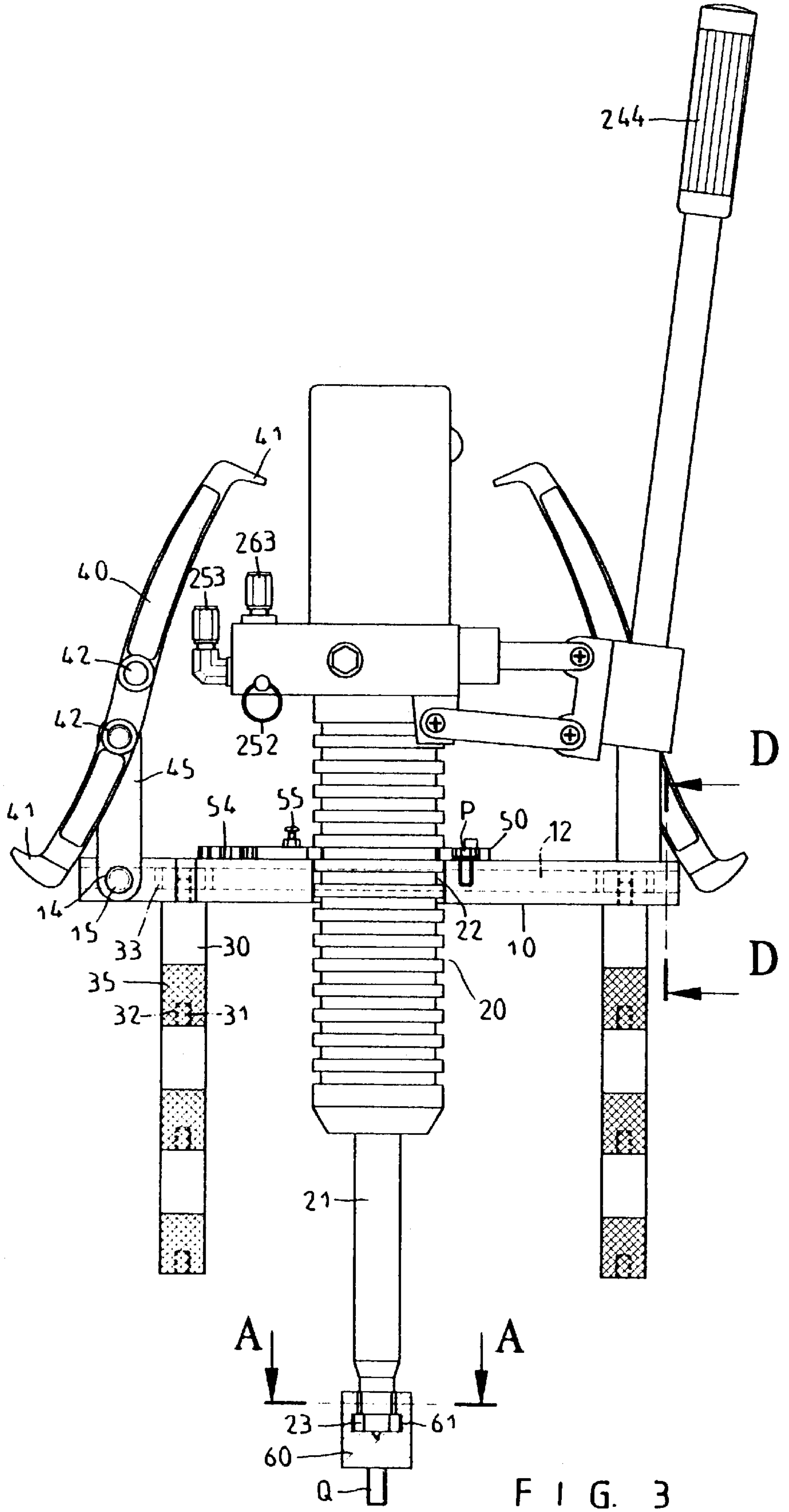
FIG. 3 is a schematic view illustrating an operation of a bearing detachment device of a preferred embodiment in accordance with the present invention.
Figure 4A:
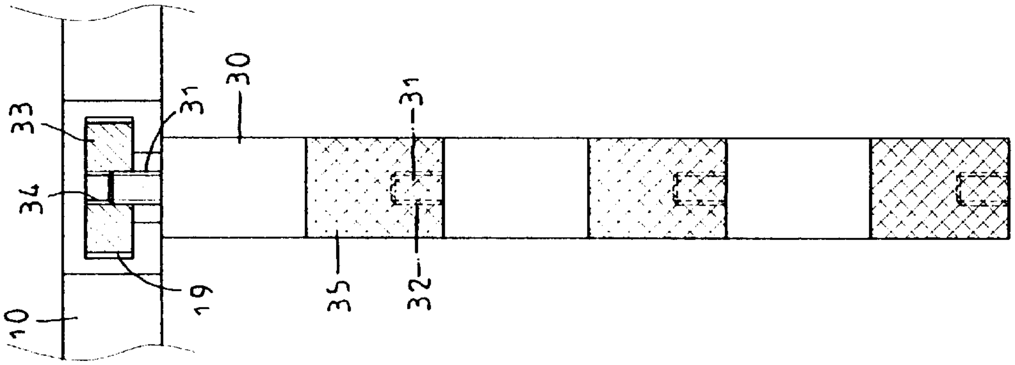
FIG. 4A is a sectional view taken along line D—D in FIG. 3.
Figure 4:
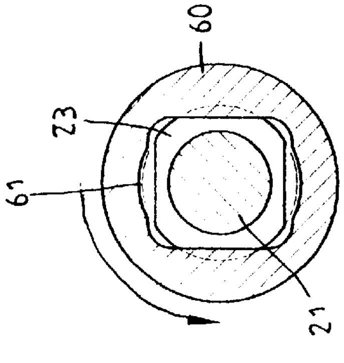
FIG. 4 is a sectional view taken along line A—A in FIG. 3.
Figure 5:
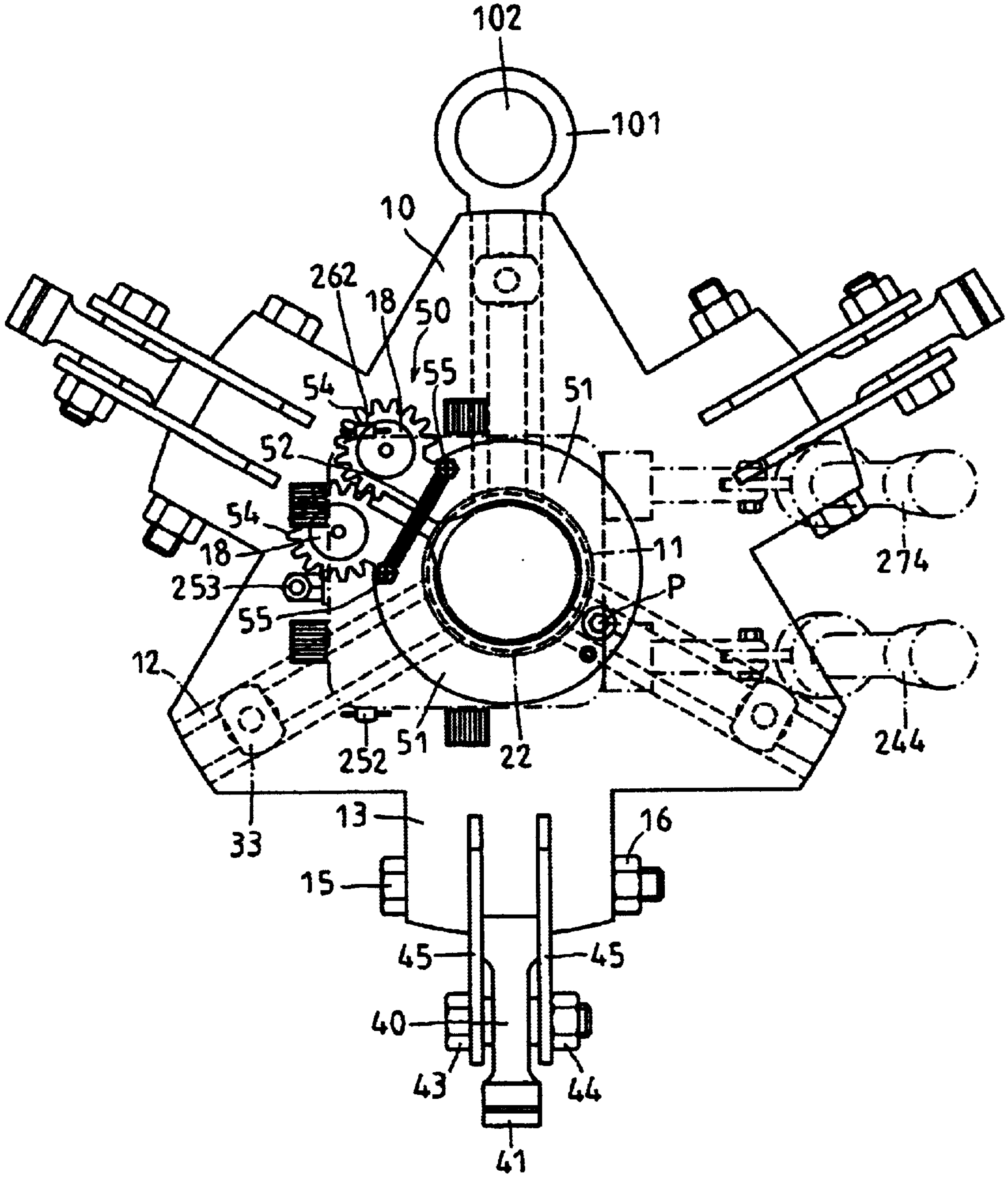
FIG. 5 is an elevational schematic view illustrating an operation of a fast positioning device of a preferred embodiment in accordance with the present invention.
Figure 6:
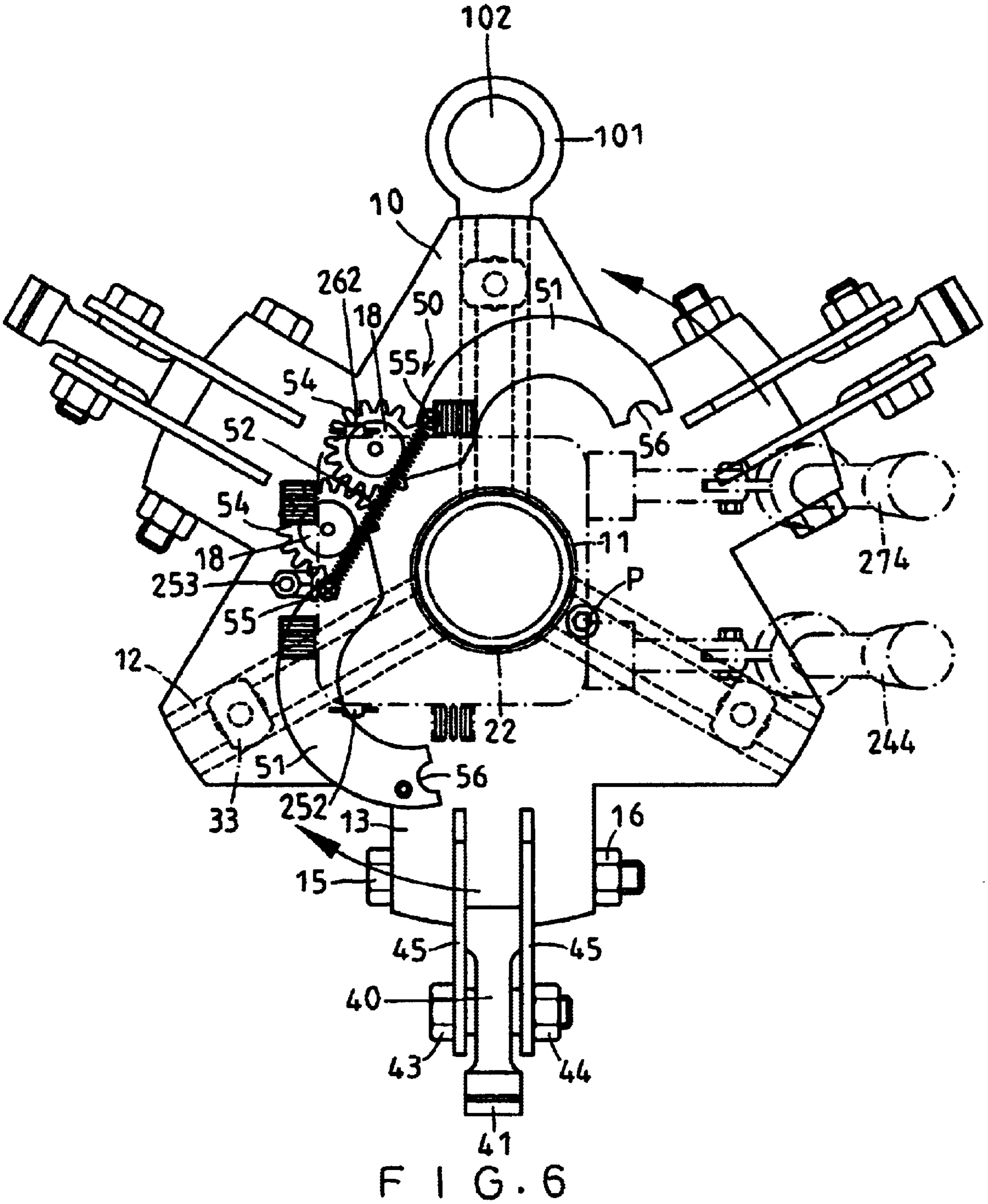
FIG. 6 is an elevational schematic view illustrating another operation of a fast positioning device of a preferred embodiment in accordance with the present invention.
Figure 7:
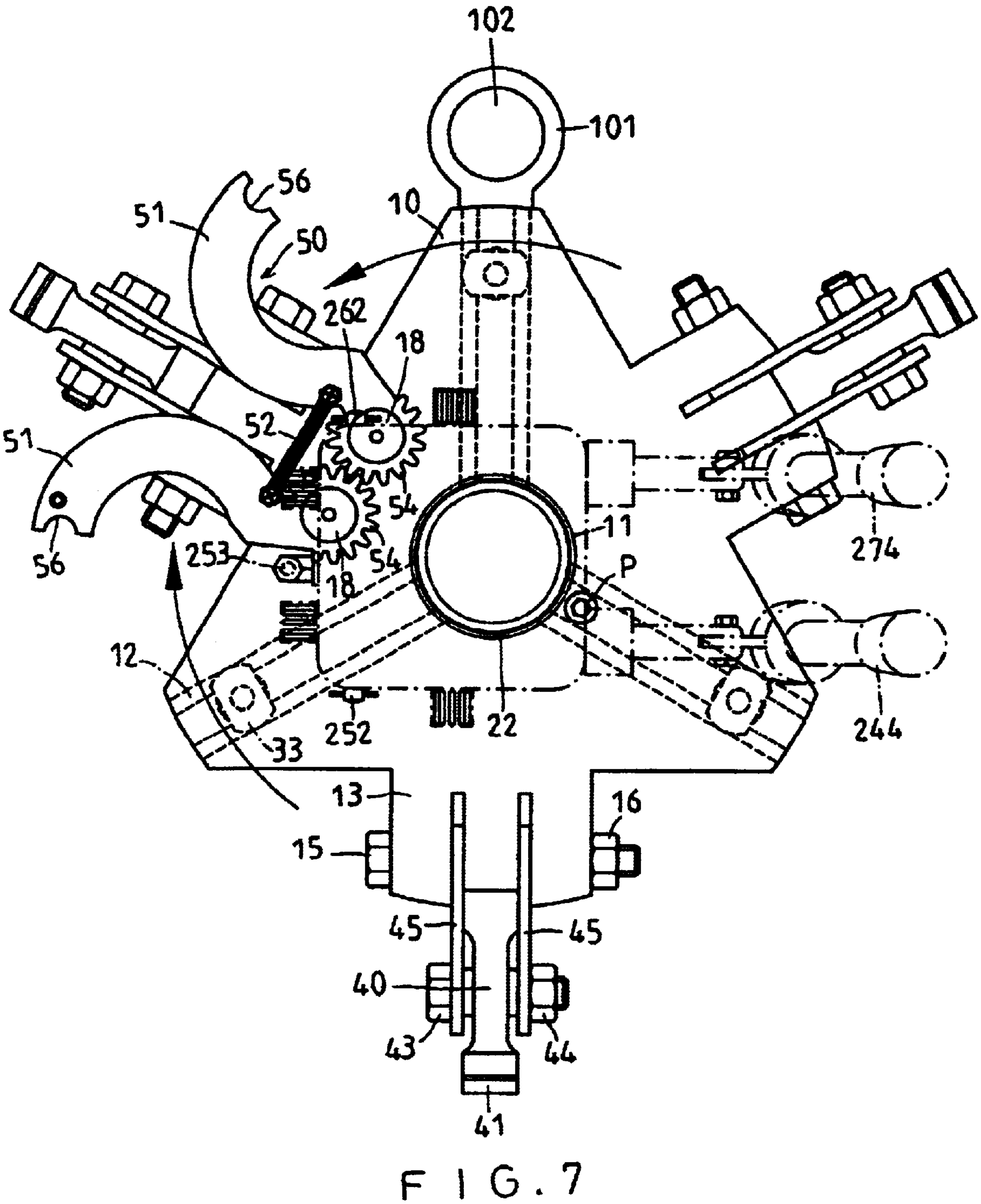
FIG. 7 is an elevational view of a fast positioning device of a preferred embodiment in accordance with the present invention.
Figure 8A:
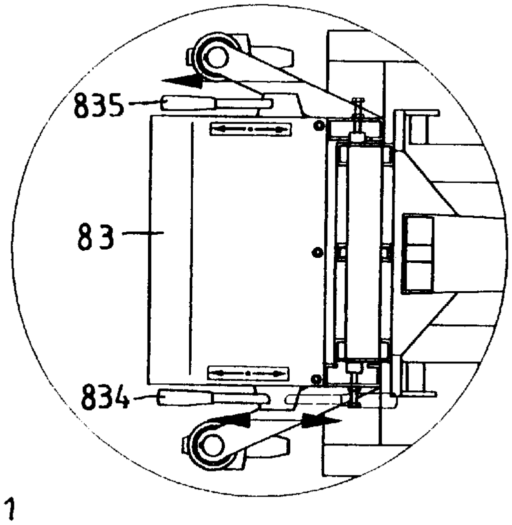
FIG. 8A is a partially elevational view of a machine frame.
Figure 8:
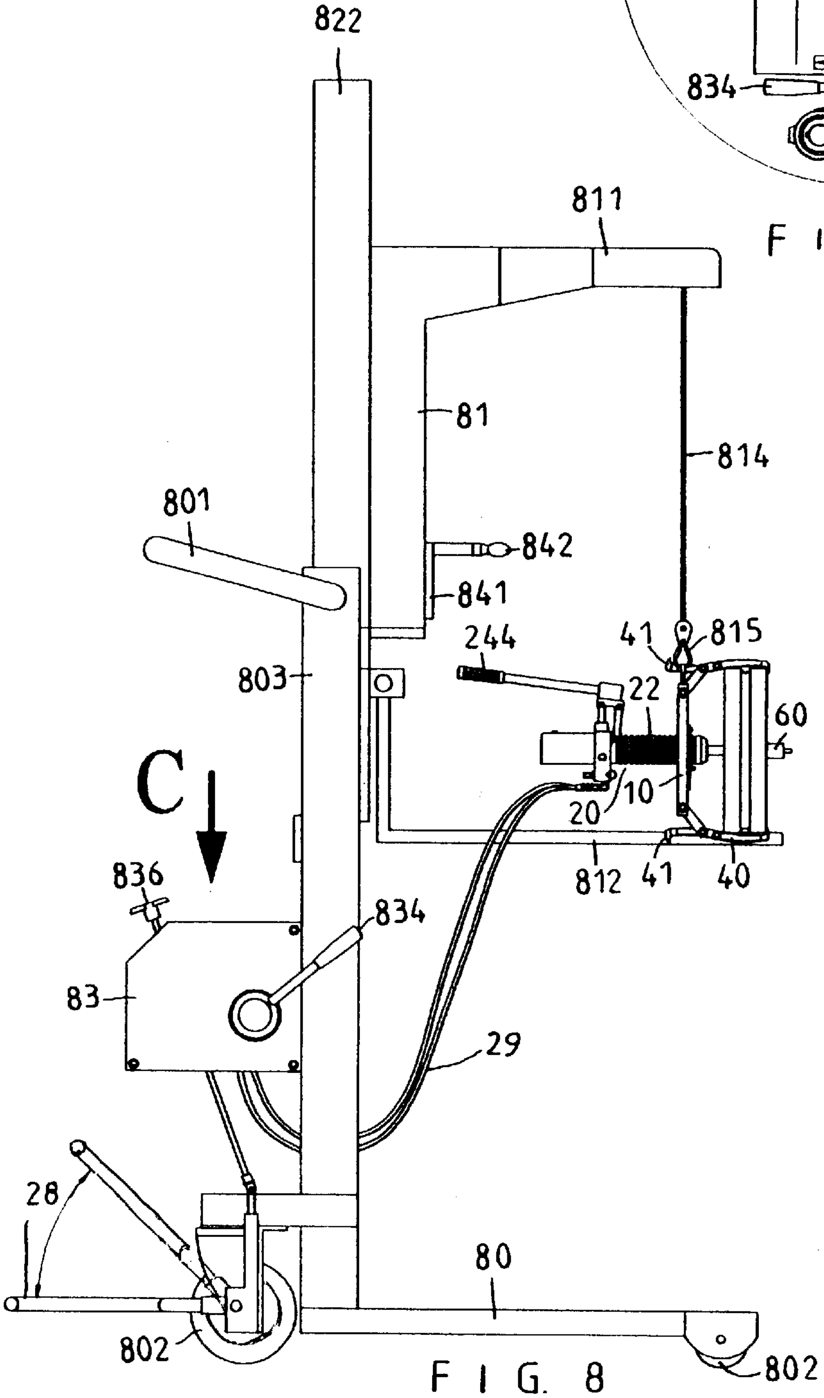
FIG. 8 is an elevational schematic view illustrating a bearing detachment device of a preferred embodiment is disposed on a machine frame.
Figure 9:
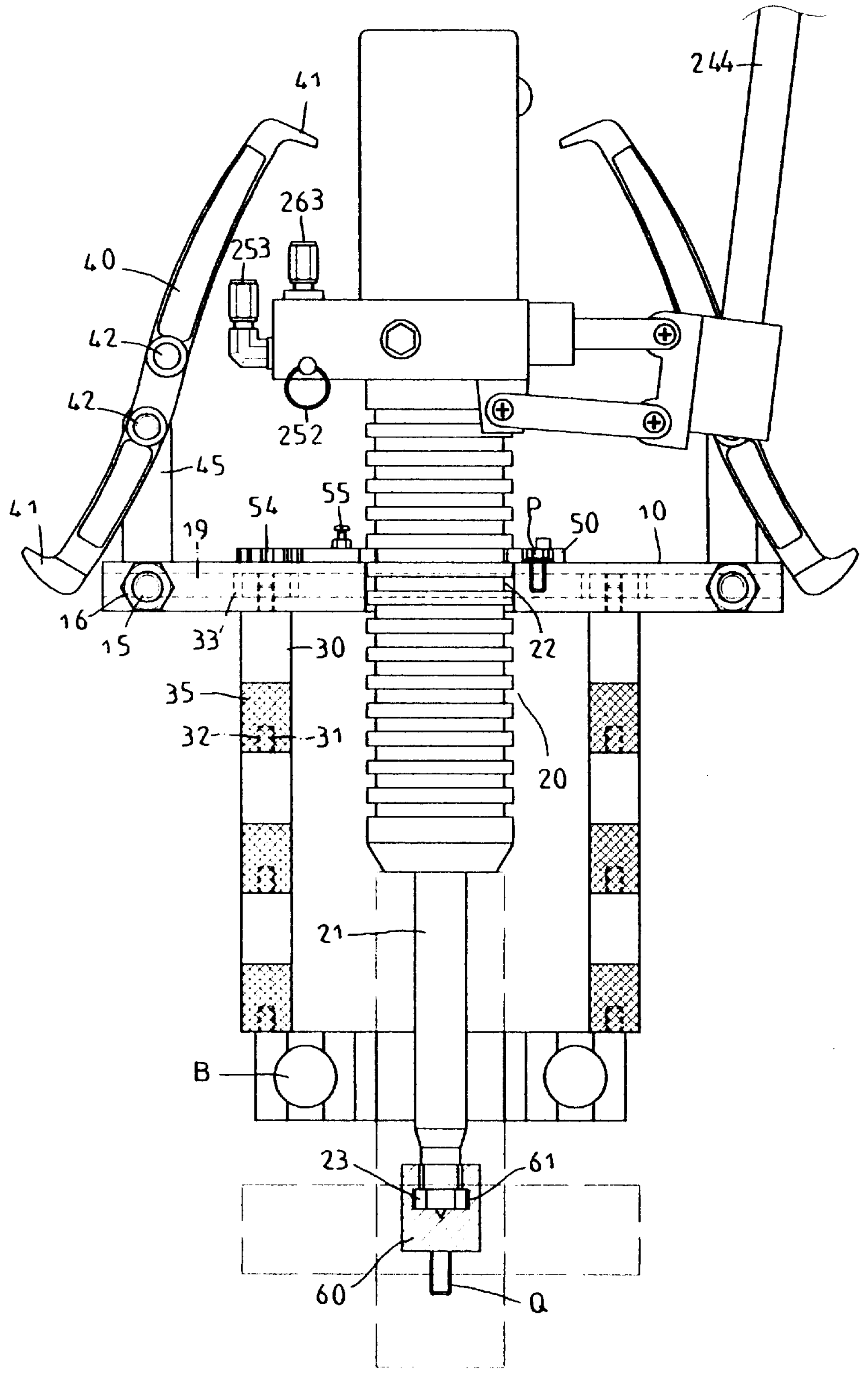
FIG. 9 is, a schematic view illustrating a bearing is assembled by a bearing detachment device of a preferred embodiment in accordance with the present invention.
Figure 10:
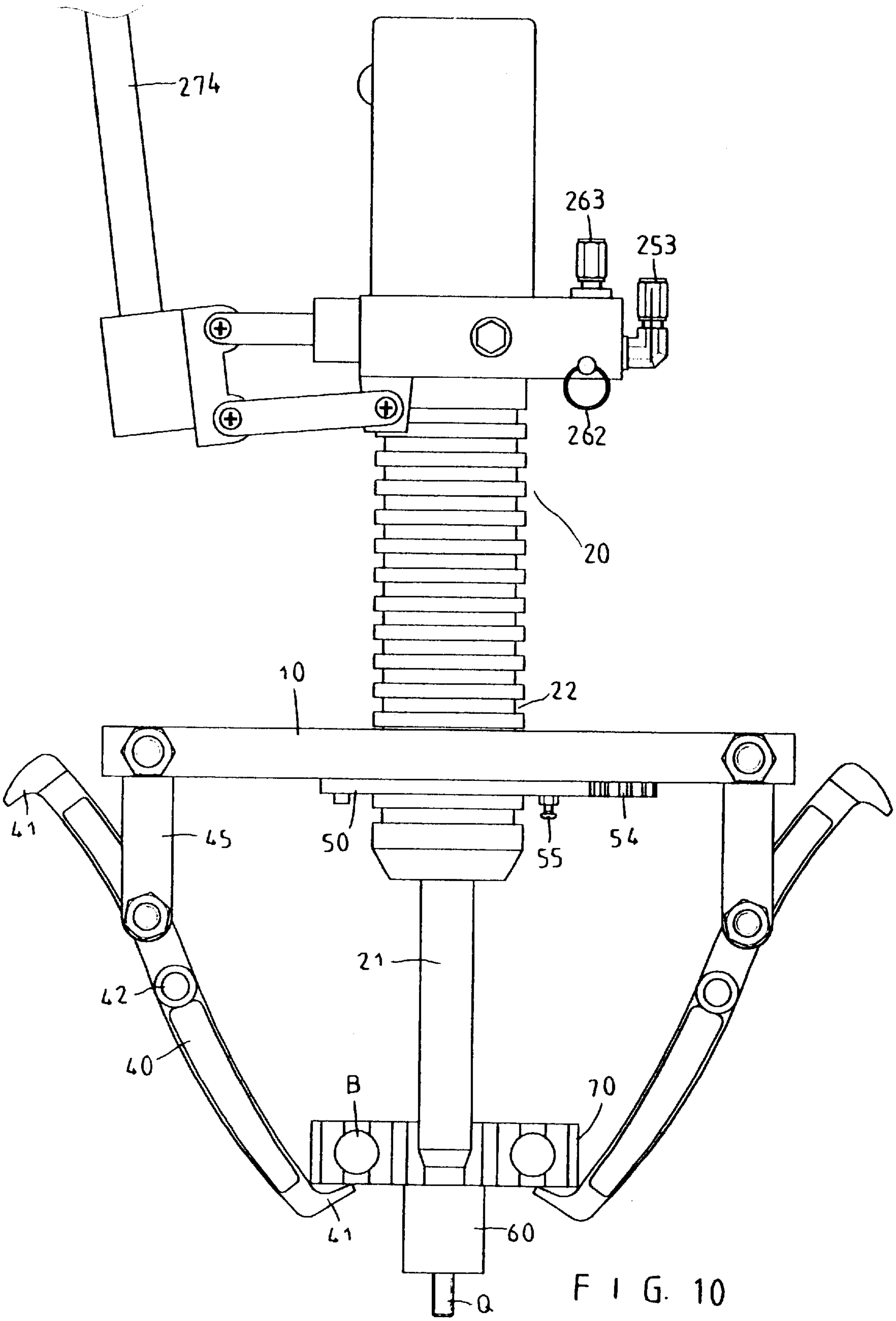
FIG. 10 is a schematic view illustrating a bearing is detached by a bearing detachment device of a preferred embodiment in accordance with the present invention.
Figure 11:
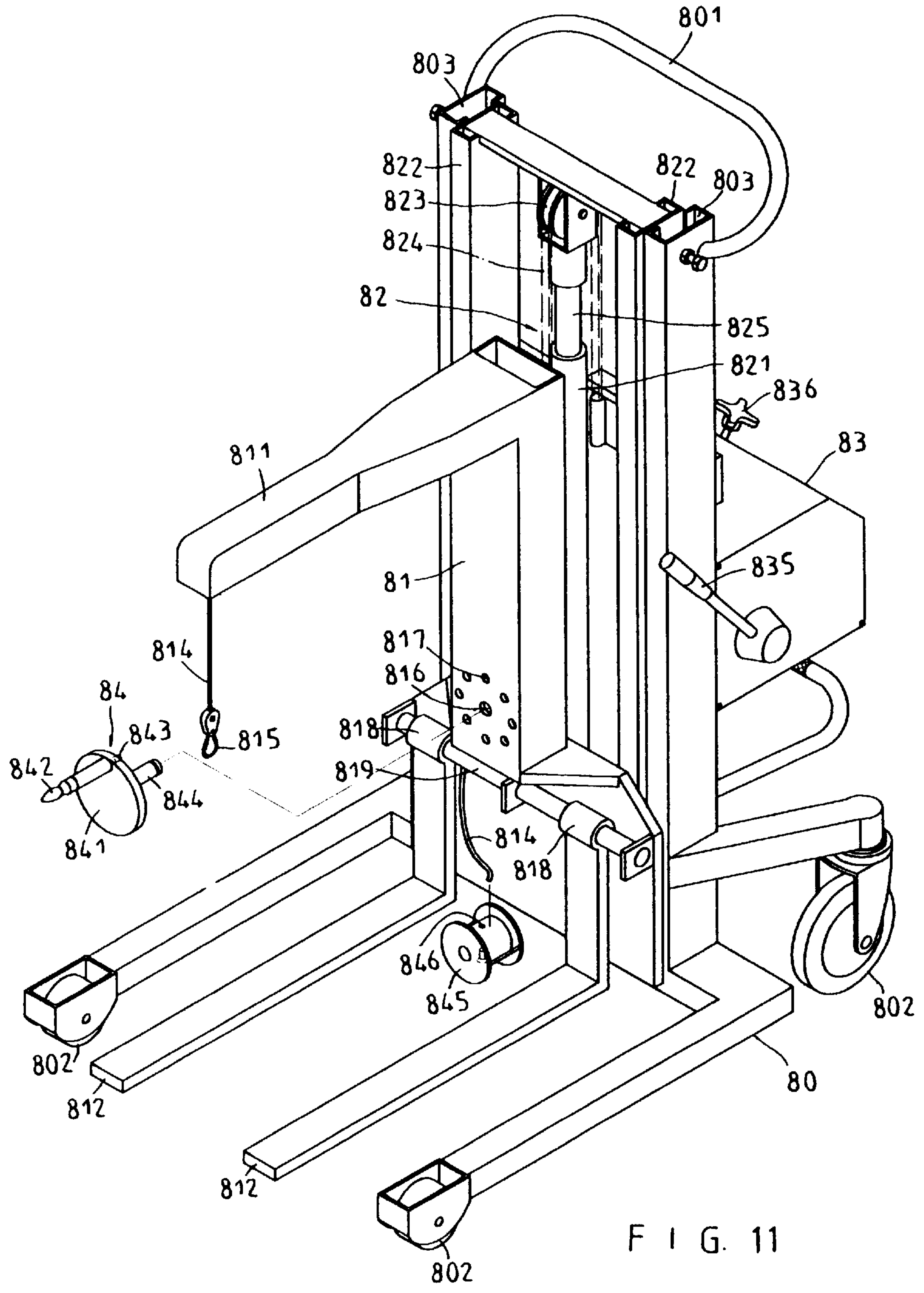
FIG. 11 is a perspective assembly view of a bearing detachment device of a preferred embodiment and a machine frame.
Figure 12:
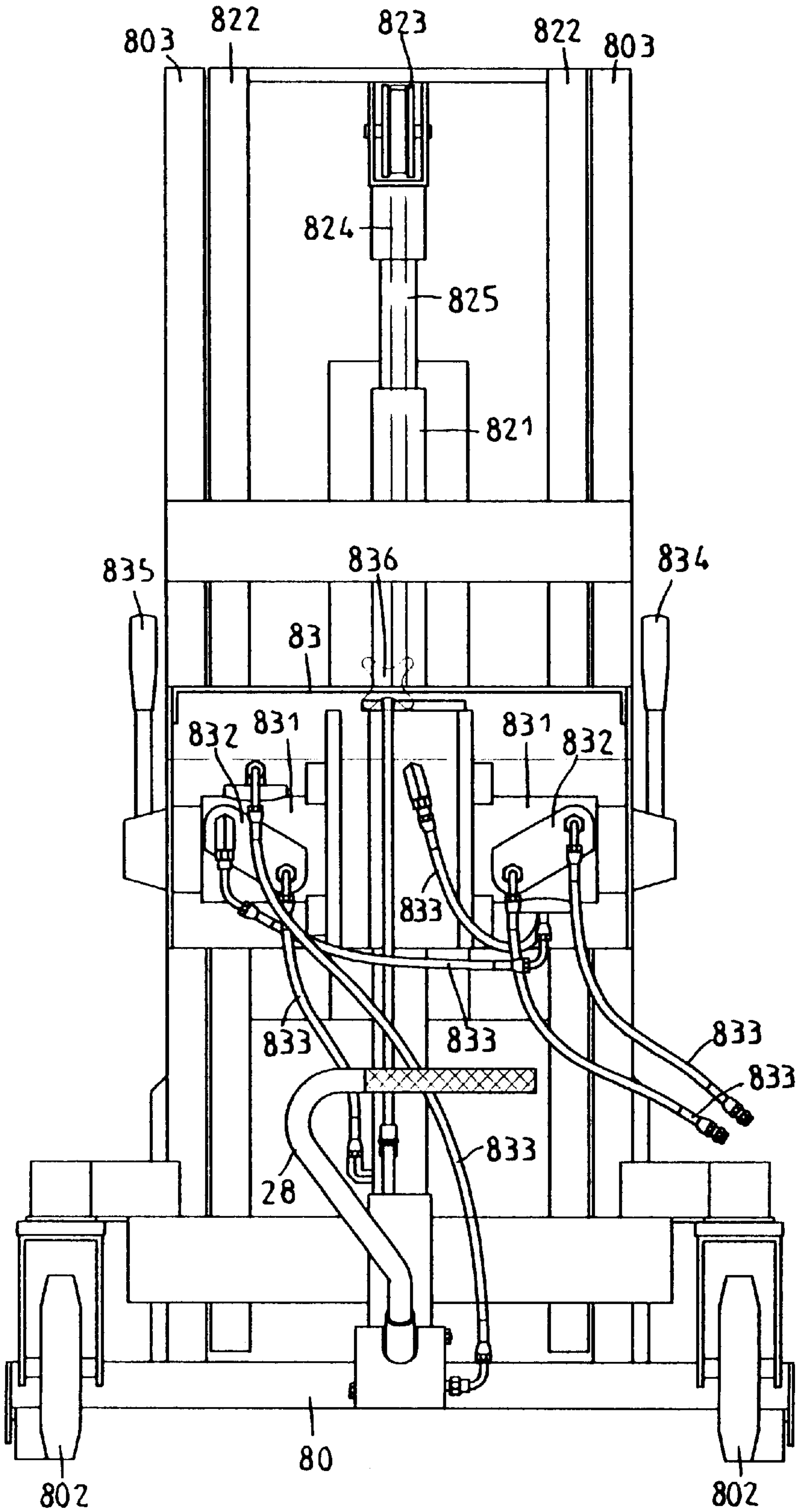
FIG. 12 ids an elevational view of FIG. 11.

Referring to FIGS. 1 to 12, a bearing detachment device comprises a main panel 10, a pneumatic cylinder 20, a plurality of support rods 30, a plurality of catch plates 40, a fast positioning device 50, a plurality of oblong blocks 33, a plurality of connecting bars 45, and a cylindrical block 60.

The main panel 10 has a center hole 11 to receive the pneumatic cylinder 20, a hanging ring 101 having a circular hole 102, a plurality of lugs 13, a plurality of bottom grooves 12, and a threaded recess 19.

Each lug 13 has a pivot aperture 14.

Each oblong block 33 has a threaded hole 34.

Each support rod 30 has at least a threaded pillar 34 inserted in the oblong block 33, a plurality of threaded apertures 32, and an embossed pattern 35.

Each oblong block 33 is inserted in the corresponding bottom groove 12.

Each catch plate 40 has two end claws 41 and at least a pivot hole 42.

Each connecting bar 45 has a first circular aperture 46 and a second circular aperture 47. Each connecting bar 45 is insert ed in the corresponding lug 13.

A bolt 15 passes through the corresponding first circular aperture 46 and the corresponding pivot aperture 14 to fasten the corresponding connecting bar 45 and the corresponding lug 13 together.

A nut 16 engages with the bolt 15.

A screw 43 passes through the corresponding second circular aperture 47 and the corresponding pivot hole 42 to fasten the corresponding connecting bar 45 and the corresponding catch plate 40 together.

A nut 44 engages with the screw 43.

The fast positioning device 50 is disposed on the main panel 10.

The fast positioning device 50 has a pair of clamping plates 51, a pair of gears 54 engaging with each other, each gear 54 disposed on the corresponding clamping plate 51, a pair of pillars 55, each pillar 55 disposed on the corresponding clamping plate 51, a spring 52 connected to the pillars 55, and two disk columns 18.

Each gear 54 has a positioning aperture 53 to receive the corresponding disk column 18.

A fastener P is inserted in the threaded recess 19.

Each clamping plate 51 has an end groove 56 to enclose the fastener P.

The clamping plates 51 clamp the pneumatic cylinder 20.

The pneumatic cylinder 20 has a periphery recess 22, a drive rod 21 having an end block 23, a first pull ring 252, a second pull ring 262, a first gas release joint 253, a second gas release joint 263, a first handle 244, and a second handle 274.

The cylindrical block 60 has an oblong groove 61 and a threaded column Q to engage with the end block 23.

A bearing B is inserted in a bearing support device 70.

The cylindrical block 60 is inserted through the bearing support device 70.

The support rods 30 block the bearing B.

The end claws 41 catch a bottom of the bearing B.

When the drive rod 21 extends downward, the bearing B disengages from the bearing support device 70.

Figure 13:
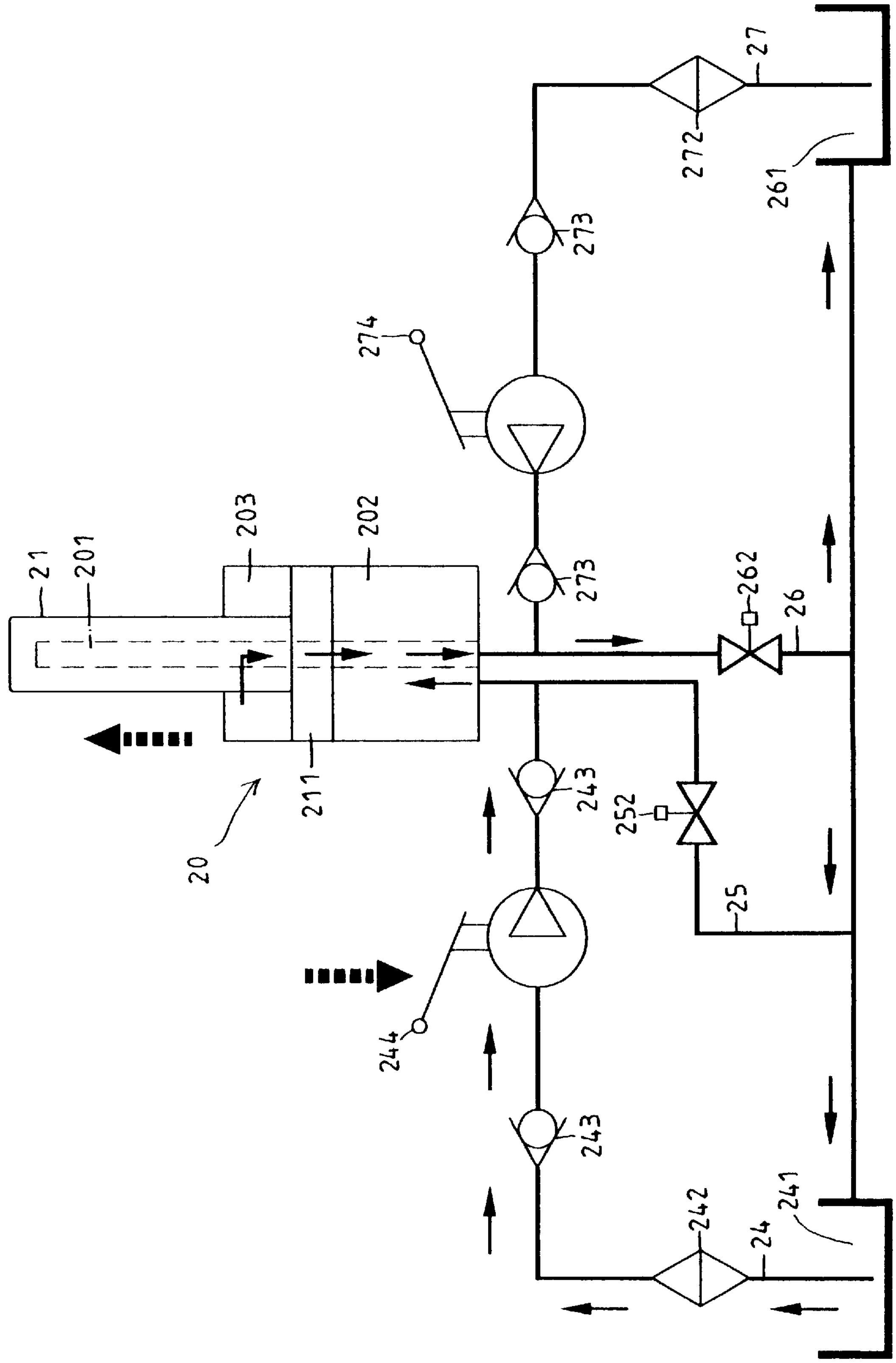
FIG. 13 is a flow diagram illustrating an operation of a pneumatic cylinder.
Figure 14:
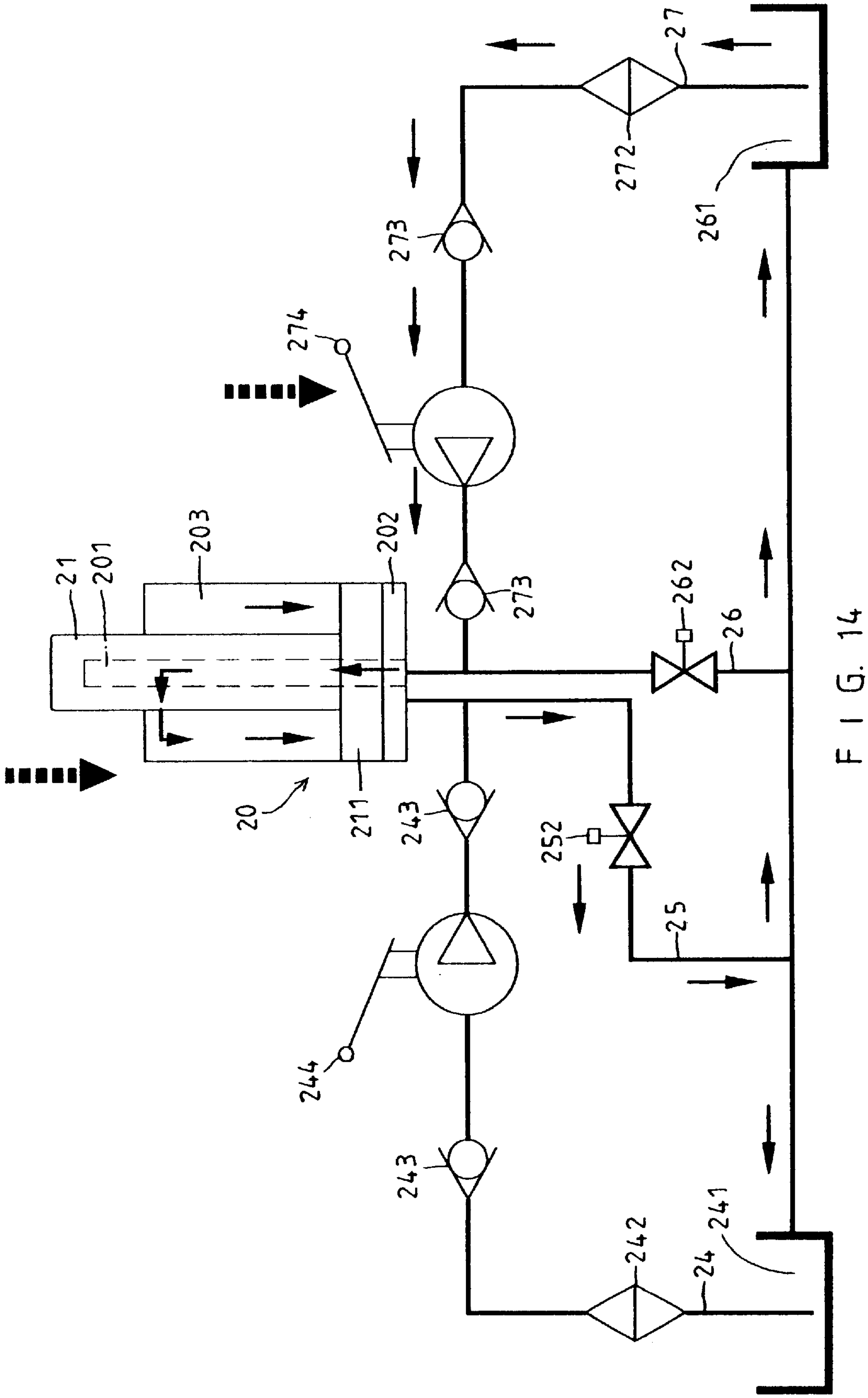
FIG. 14 is a flow diagram illustrating another operation of a pneumatic cylinder.
Figure 15A:
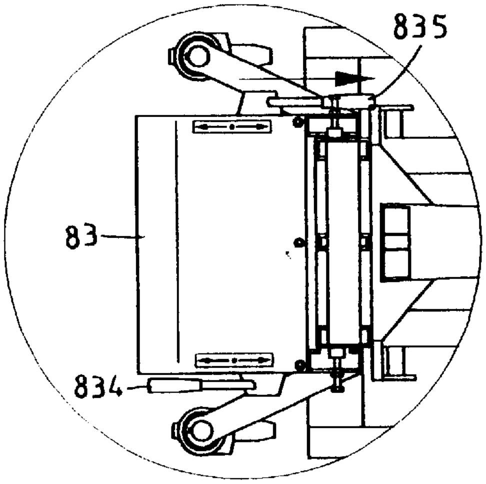
FIG. 15A is a partially elevational view of a machine frame while a hanging device is ascended.
Figure 15:
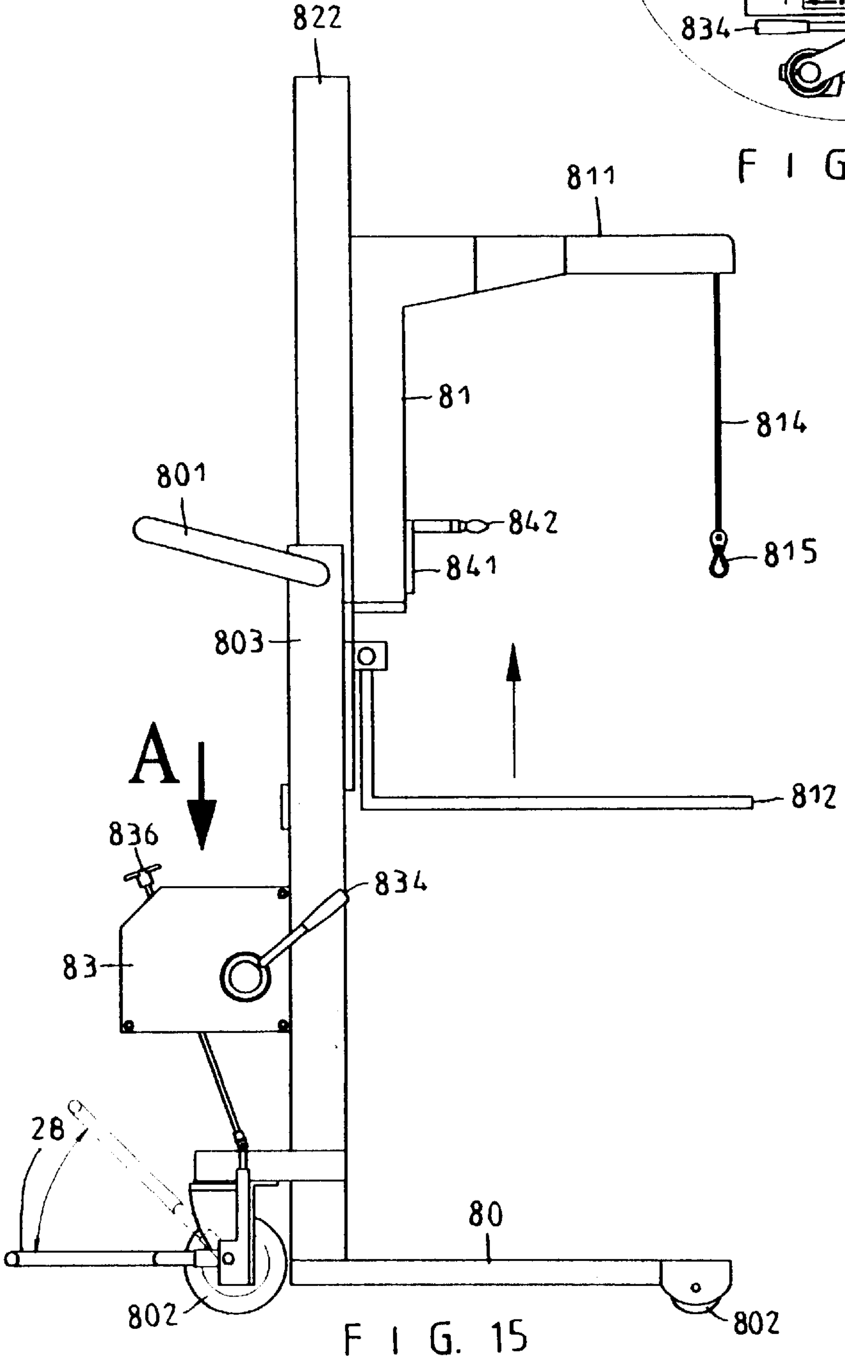
FIG. 15 is an elevational schematic view illustrating a hanging device is ascended.
Figure 16A:
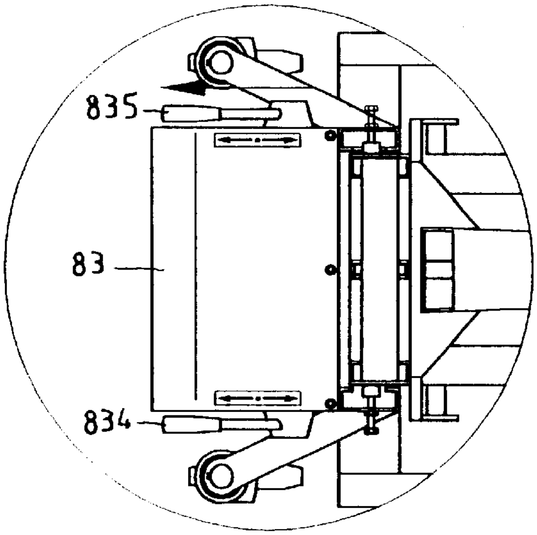
FIG. 16A is a partially elevational view of a machine frame while a hanging device is descended.
Figure 16:
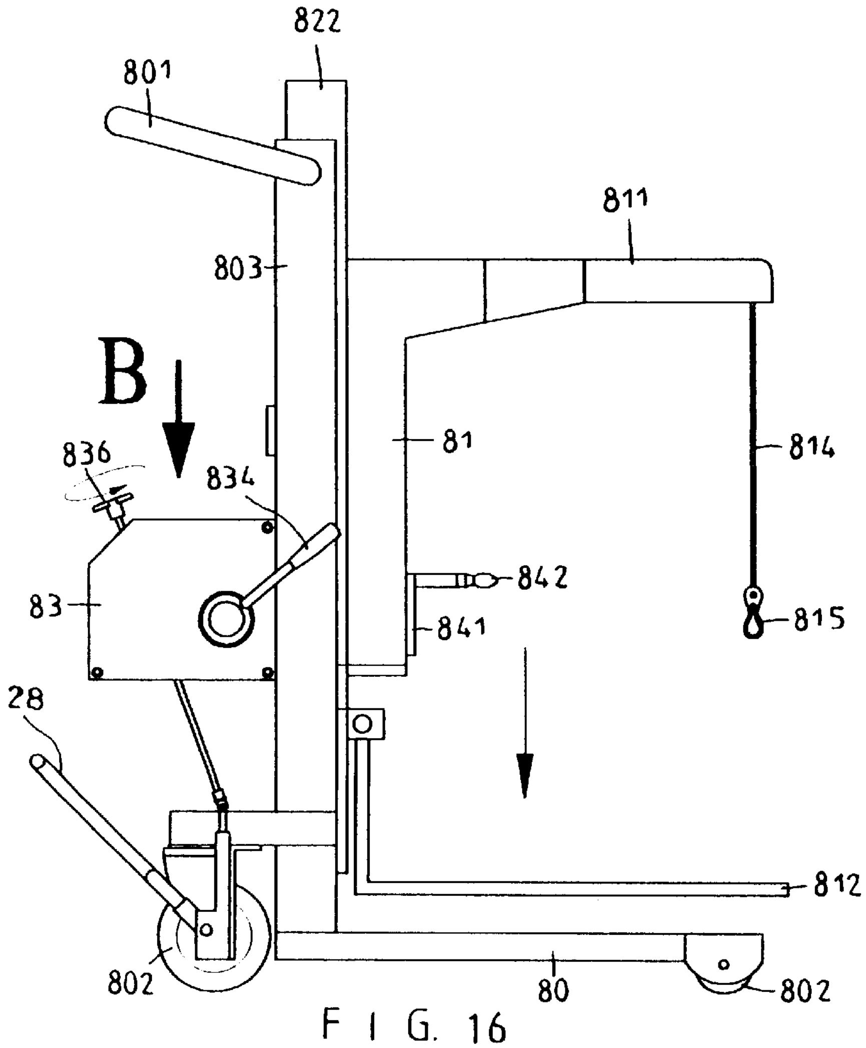
FIG. 16 is an elevational schematic view illustrating a hanging device is descended.

Referring to FIGS. 13 and 14, the pneumatic cylinder 20 has a first chamber 202, a second chamber 203, a piston 211 separating the first chamber 202 and the second chamber 203, a gas output pipe 201 inserted in the drive rod 21, a first gas input pipe 24 connected to a first gas container 241 and the first chamber 202, a first gas return pipe 25 connected to the first chamber 202, a second gas input pipe 27 connected to a second gas container, 261 and the second chamber 203, a second gas return pipe 26 connected to the second chamber 203, a first filter 242 and a plurality of first non-return valves 243 connected to the first gas input pipe 24, and a second filter 272 and a plurality of second non-return valves 273 connected to the second gas input pipe 27.

The first handle 244 is connected to the first gas input pipe 24.

The second handle 274 is connected to the second gas input pipe 27.

The first pull ring 252 is connected to the first gas return pipe 25.

The second pull ring 262 is connected to the second gas return pipe 26.

When the first handle 244 controls the first gas input pipe 24 to flow gas therein, the gas will enter the first chamber 202. Then the second pull ring 262 is operated, so the gas in the second chamber 203 flows from the gas output pipe 201 to the gas return pipe 26.

When the second handle 274 controls the second gas input pipe 27 to flow gas therein, the gas enters the gas output pipe 201 and the second chamber 203. Then the first pull ring 252 is operated, so the gas flows from the first chamber 202 to the first gas return pipe 25.

Referring to FIGS. 8, 8A, 11, 12, 15, 15A, 16 and 16A, the bearing detachment device further comprises a machine frame 80.

The machine frame 80 has a hanging device 81, an elevator device 82, a control box 83, a micro-adjustment device 84, a pair of L-shaped plates 812, a grip 801, and a plurality of:casters 802.

The grip 801 is disposed on a top portion of the machine frame 80.

The casters 802 are disposed on a bottom of the machine frame 80.

The elevator device 82 has an oil cylinder 821, an elevator frame 822, a pair of rail frames 803 engaging with the elevator frame 822 respectively, a pulley 823, a chain 824, and an elevator rod 825 connected to the oil cylinder 821.

The elevator rod 825 is disposed on the elevator frame 822.

The pulley 823 is disposed on a top portion of the elevator frame 822.

The chain 824 surrounds the pulley 823.

The hanging device 81 has a suspender 811, a rope 814 disposed on the suspender 811, a hook 815 connected to one end of the rope 814, a through hole 816, and a plurality of round apertures 817.

A reel 845 is disposed on the hanging device 81. The reel 845 has a through aperture 846 to receive the other end of the rope 814.

The micro-adjustment device 84 has a rotating disk 841, a rotating bar 842, a rotating shaft 844, and a protrusion 843.

The rotating shaft 844 is inserted in the through hole 816. The rope 814 winds the rotating shaft 844.

The protrusion 843 is inserted in one of the round apertures 817.

A main shaft 819 is disposed on the machine frame 80.

Each L-shaped plate 812 has an end sleeve 818 enclosing the main shaft 819.

Referring to FIGS. 11 and 12 again, the control box 83 has a pair of oil boxes 831, a pair of control valves 832 connected to the oil boxes 831 respectively, a plurality of oil pipes 833 connected to the control valves 832 respectively, an oil release button 836, a switch bar 834, and a control bar 835.

The oil release button 836, the switch bar 834, and the control bar 835 control an elevation of the elevator device 82.

A plurality of wires 29 are connected to the control box 83 and the pneumatic cylinder 20.

A pedal 28 is connected to one of the casters 802.

When the main panel 10 is not used, the hanging ring 101 is hooked by the hook 815.

The present invention is not limited to the above embodiment but various modification thereof may be made.

Furthermore, various changes in form and detail may be made without departing from the scope of the present invention.

We claim:

1. A bearing detachment device comprises:

a main panel, a pneumatic cylinder, a plurality of support rods, a plurality of catch plates, a fast positioning device, a plurality of oblong blocks, a plurality of connecting bars, and a cylindrical block, the main panel having a center hole to receive the pneumatic cylinder, a hanging ring having a circular hole, a plurality of lugs, a plurality of bottom grooves, and a threaded recess, each said lug having a pivot aperture, each said oblong block having a threaded hole, each said support rod having at least a threaded pillar inserted in the oblong block, and a plurality of threaded apertures, each said oblong block inserted in the corresponding bottom groove, each said catch plate having two end claws and at least a pivot hole, each said connecting bar having a first circular aperture and a second circular aperture, each said connecting bar inserted in the corresponding lug, a bolt passing through the corresponding first circular aperture and the corresponding pivot aperture to fasten the corresponding connecting bar and the corresponding lug together, a screw passing through the corresponding second circular aperture and the corresponding pivot hole to fasten the corresponding connecting bar and the corresponding catch plate together, the fast positioning device disposed on the main panel, the fast positioning device having a pair of clamping plates, a pair of gears engaging with each other, each said gear disposed on the corresponding clamping plate, a pair of pillars, each said pillar disposed on the corresponding clamping plate, a spring connected to the pillars, and two disk columns, each said gear having a positioning aperture to receive the corresponding disk column, a fastener inserted in the threaded recess, each said clamping plate having an end groove to enclose the fastener, the clamping plates clamping the pneumatic cylinder, the pneumatic cylinder having a periphery recess, a drive rod having an end block, a first pull ring, a second pull ring, a first gas release joint, a second gas release joint, a first handle, and a second handle, the cylindrical block having an oblong groove and a threaded column to engage with the end block.

2. The bearing detachment device as claimed in claim 1, wherein the pneumatic cylinder has a first chamber, a second chamber, a piston separating the first chamber and the second chamber, a gas output pipe inserted in the drive rod, a first gas input pipe connected to a first gas container and the first chamber, a first gas return pipe connected to the first chamber, a second gas input pipe connected to a second gas container and the second chamber, a second gas return pipe connected to the second chamber, a first filter and a plurality of first non-return valves connected to the first gas input pipe, and a second filter and a plurality of second non-return valves connected to the second gas input pipe, the first handle is connected to the first gas input pipe, the second handle is connected to the second gas input pipe, the first pull ring is connected to the first gas return pipe, and the second pull ring is connected to the second gas return pipe.

3. The bearing detachment device as claimed in claim 1, wherein the bearing detachment device further comprises a, machine frame having a hanging device, an elevator device, a control box, a micro-adjustment device and a plurality of casters, the casters disposed on a bottom of the machine frame, the elevator device having an oil cylinder, an elevator frame, a pair of rail frames engaging with the elevator frame respectively, a pulley, a chain and an elevator rod connected to the oil cylinder, the elevator rod disposed on the elevator frame, the pulley disposed on a top portion of the elevator frame, and the chain surrounding the pulley.

4. The bearing detachment device as claimed in claim 3, wherein the hanging device has a suspender, a rope disposed on the suspender, a hook connected to one end of the rope, a through hole and a plurality of round apertures, a reel disposed on the hanging device, and the reel has a through aperture to receive the other end of the rope.

5. The bearing detachment device as claimed in claim 3, wherein the micro-adjustment device has a rotating disk, a rotating bar, a rotating shaft and a protrusion, the rotating shaft inserted in the through hole, the rope winding the rotating shaft, and the protrusion inserted in one of the round apertures.

6. The bearing detachment device as claimed in claim 3, wherein a main shaft is disposed on the machine frame and a pair of L-shaped plates each has an end sleeve enclosing the main shaft.

* * * * *